United States Patent [19]
Kishikawa et al.

[11] 3,804,705
[45] Apr. 16, 1974

[54] MULTI-LAYER PRODUCT HAVING A PROTECTIVE LAYER CONTAINING A BLEND OF POLYMERS

[75] Inventors: Hiroshi Kishikawa, Toyonaka; Kiyoshi Yasuno, Ibaragi; Shuji Kitamura, Toyonaka, all of Japan

[73] Assignee: Sumitomo Chemical Company, Limited, Osaka-fu, Japan

[22] Filed: Dec. 29, 1971

[21] Appl. No.: 213,810

[30] Foreign Application Priority Data
Dec. 29, 1970  Japan................................ 45-124414

[52] U.S. Cl. .... 161/253, 117/138.8 E, 117/138.8 R, 117/161 UC, 117/161 UB, 161/247, 161/252, 161/254, 260/876 R
[51] Int. Cl........................... B32b 27/08, B44d 1/09
[58] Field of Search ........... 161/247, 252, 253, 254; 260/876 R, 878 R; 117/138.8 E, 138.8 R, 161 UC, 161 UB

[56] References Cited
UNITED STATES PATENTS

| 3,366,709 | 1/1968 | Baer | 260/878 R |
| 3,432,576 | 3/1969 | Beer | 260/878 R |
| 3,447,997 | 6/1969 | Kamal | 161/254 X |
| 3,641,206 | 2/1972 | Weitzel et al. | 260/876 R |
| 3,322,858 | 5/1967 | Coaker et al. | 260/876 R |
| 3,358,054 | 12/1967 | Bonn et al. | 260/878 R |
| 3,473,996 | 10/1969 | Whalen | 161/254 X |

Primary Examiner—George F. Lesmes
Assistant Examiner—Lorraine T. Kendell
Attorney, Agent, or Firm—Stewart and Kolasch Ltd.

[57]  ABSTRACT

A multi-layer product which comprises a layer made of a synthetic resin and a protective layer made of an acrylic resin incorporated with ethylene:vinyl acetate copolymer-vinyl chloride graft copolymer adhered thereon, the graft copolymer being prepared by graft-polymerizing vinyl chloride on ethylene:vinyl acetate copolymer containing 20 to 60 percent by weight of vinyl acetate unit (on the basis of the amount of the copolymer) at a weight ratio of 10:90 to 90:10 and the content of the graft copolymer being 1 to 50 percent by weight (on the basis of the amount of the protective layer). The multi-layer product has a good weather-proof property, and a beautiful appearance.

14 Claims, No Drawings

MULTI-LAYER PRODUCT HAVING A PROTECTIVE LAYER CONTAINING A BLEND OF POLYMERS

The present invention relates to a multi-layer product of synthetic resin. More particularly, it relates to a multi-layer product of synthetic resin having a good weather-proof property, and a beautiful appearance.

It is known that products made of a synthetic resin material having an inferior weather-proof property such as acrylonitrile-butadiene-styrene resin (hereinafter referred to as "ABS"), methyl methacrylate-butadiene-styrene resin (hereinafter referred to as "MBS"), high impact polystyrene resin (hereinafter referred to as "HIPS"), polypropylene resin (hereinafter referred to as "PP") and polyvinyl chloride resin (hereinafter referred to as "PVC") frequently cause a deterioration in their mechanical properties when used in the outdoors. Because of this reason, their field of application is considerably restricted in spite of their excellent mechanical properties.

In order to overcome such defects, it has been proposed to incorporate an ultraviolet ray inhibitor into the said synthetic resin so as to prevent the deterioration of the mechanical properties due to sunlight. This solution is effective to a certain extent but still is not satisfactory. It has also been proposed to provide a protective layer made of an acrylic resin on a product made of the said synthetic resin. This is a quite good solution for preventing of the said deterioration, because the acrylic resin possesses one of the highest weather-proof properties among various synthetic resins and has a relatively low oxygen-permeability. Thus, providing a protective layer made of an acrylic resin containing an ultraviolet ray inhibitor on the surface of a product made of a synthetic resin which is inferior in its weather-proof property can protect the synthetic resin against the adverse influences due to ultraviolet rays and oxygen and maintain good mechanical properties inherent to the synthetic resin. In addition, the protective layer can afford a beautiful appearance on the product, because the acrylic resin itself is transparent and lustrous.

As is well known, however, an acrylic resin is quite fragile so that it tends to be broken even with a slight shock or bend. Therefore, it is highly desired to provide the protective layer made of the acrylic resin itself with a high impact strength and a good elasticity.

As the result of extensive study, it has been found that the use of an acrylic resin incorporated with ethylene: vinyl acetate copolymer-vinyl chloride graft copolymer (hereinafter referred to as "EVA/VC" graft copolymer) can afford a protective layer having a high impact strength and a good elasticity which also effectively protects a product of a synthetic resin from the adverse influences of ultraviolet rays and oxygen. Although the improvement of the impact strength of an acrylic resin by incorporation of ethylene:vinyl acetate copolymer (hereinafter referred to as "EVA") is known, the transparency and luster of the resulting composition is markedly decreased. To the contrary, the incorporation of the EVA/VC graft copolymer does not result in a material reduction of the transparency and luster of the acrylic resin incoporated therewith. This is quite meritorious, because the patterns on the surface of the synthetic resin are not concealed and thus look beautiful when the acrylic resin is applied thereon. Besides, the incorporation of the EVA/VC graft copolymer assures, advantageously, a better adhesion between the acrylic resin incorporated therewith and a binding agent such as EVA which can be used for adhering the acrylic resin on a synthetic resin.

According to the present invention, there is provided a multi-layer product which comprises a layer made of a synthetic resin and a protective layer made of an acrylic resin incorporated with the EVA/VC graft copolymer adhered thereon.

The synthetic resin as the base material to be protected may be any synthetic resin of inferior weather-proof property. Examples of the synthetic resin are ABS, MBS, HIPS, PP and PVC, and their blends with each other and/or other resin.

The acrylic resin may be selected from the homopolymers of methyl acrylate and methyl methacrylate and the copolymers of these monomers with at least one of the vinyl monomers such as styrene, acrylonitrile, N-allylmaleimide, alkyl acrylates of which the alkyl moiety has one to eight carbon atoms (e.g., methyl acrylate, ethyl acrylate, butyl acrylate), alkyl methacrylates of which the alkyl moiety has one to eight carbon atoms (e.g., methyl methacrylate, ethyl methacrylate, butyl methacrylate) and the like.

The EVA/VC graft copolymer to be incorporated into the acrylic resin may comprise EVA containing about 20 to 60 percent by weight of vinyl acetate (on the basis of the amount of EVA) and vinyl chloride graft-polymerized thereon at a weight ratio of from about 10:90 to 90:10. Such EVA/VC graft copolymer can be produced, for instance, by graft-copolymerizing vinyl chloride on EVA in the presence of a free radical catalyst. If necessary, a certain portion of vinyl chloride may be replaced by any other polymerizable monomer. The EVA/VC graft copolymer sometimes contains certain amounts of EVA and vinyl chloride polymer, but no serious and unfavorable influence is caused thereby. The incorporation of a stabilizer into the EVA/VC graft copolymer is often required and, in such a case, a conventional stabilizer for polyvinyl chloride may be used.

The amount of the EVA/VC graft copolymer to be incorporated into the acrylic resin is usually from about 1 to 50 percent by weight (on the basis of the combined amount of the acrylic resin and the EVA/VC graft copolymer). A lesser amount than the said lower limit does not result in a satisfactory increase of the impact strength and the elasticity. A higher amount than the said upper limit causes a reduction in the transparency and luster inherent to the acrylic resin.

Besides, any additive conventionally employed with an acrylic resin such as an ultraviolet ray inhibitor and a coloring agent may be incorporated into the acrylic resin, insofar as no unfavorable influence is caused thereby.

For incorporating the EVA/VC graft copolymer and any additive into the acrylic resin, there may be adopted a conventional mixing procedure, i.e., by the aid of a roll, an extruder or a Bumbury mixer.

The adhesion of a protective layer made of the acrylic resin incorporated with the EVA/VC graft copolymer on the surface of a layer made of the synthetic resin can be accomplished with or without the use of a binding agent. When any binding agent is employed, the use of EVA is recommended. The performance of cross-linking on adhesion or the combined use of any other binding agent may increase the adhesive effect of EVA.

One of the typical procedures for preparation of the multi-layer product of the invention comprises applying EVA on the surface of the synthetic resin layer and, after drying, applying the acrylic resin layer thereon by the aid of an appropriate machine such as a laminating device, a roll or a calender. Another typical procedure comprises laminating EVA on the synthetic resin layer and applying the acrylic resin layer thereon. A further typical procedure comprises melt binding the synthetic resin layer with the acrylic resin layer.

The multi-layer product of the invention may be further adhered to any substrate material such as a metal plate, a wooden plate or a glass plate.

Practical and presently preferred embodiments of the invention are illustratively shown in the following Examples wherein parts are by weight.

EXAMPLE 1

Acrylic resin ("Sumipex LG" manufactured by Sumitomo Chemical Co., Ltd.) (80 parts), EVA/VC graft copolymer ("Sumigraft GF" manufactured by Sumitomo Chemical Co., Ltd.) (20 parts), a stabilizer for polyvinyl chloride ("KS-41" manufactured by Kyodo Yakuhin Co., Ltd.) (1 part) and an ultraviolet ray inhibitor ("Tinuvin 326" manufactured by Geigy A.G.) (0.5 part) are kneaded by the aid of a 30 mm$\phi$ extruder. Using an inflation film manufacturer, an acrylic resin film of 70 $\mu$ thickness is formed from the resulting mixture. The film is excellent in transparency and luster and shows a good elasticity.

An ABS resin ("Kurarastic MV" manufactured by Sumitomo Naugatuck Co., Ltd.) is pressed to form a sheet of 1 mm thickness. An EVA emulsion ("Sumikaflex No. 400" manufactured by Sumitomo Chemical Co., Ltd.) is applied on both surfaces of the above formed sheet of ABS resin, followed by drying. The acrylic resin film as obtained above is adhered on the ABS resin sheet by the aid of a press at 180° C to give a multilayer product consisting of three layers, i.e., an acrylic resin layer-ABS resin layer-acrylic resin layer, which has an excellently lustrous surface.

The weather-proof property of the multi-layer product determined by a weather-O-meter (manufactured by Shimadzu Seisakusho Limited) is shown in Table 1, compared with that of a sheet of ABS resin. The weather-proof property is indicated by the change in Dynestadt impact strength.

TABLE 1.—DYNESTADT IMPACT STRENGTH (kg-cm/cm²)

| Weather-O-meter retention time (hrs.): Test piece | 0 | 50 | 100 | 200 |
|---|---|---|---|---|
| Multi-layer product according to the invention | 40 | 40 | 40 | 40 |
| ABS resin ("Kurarastic MV") as control | 40 | 15 | 15 | 15 |

From the above results, it is seen that the impact strength of ABS resin decreases to about one-third of its original value within a short time when exposed to an outdoor atmosphere. In case of the multi-layer product of the invention, no reduction in the impact strength is seen. Even on bending, the multi-layer product of the invention is not broken.

EXAMPLE 2

A PVC resin ("Sumilit SX-7G" manufactured by Sumitomo Chemical Co., Ltd.) (80 parts), an MBS resin ("Kaneace B-12" manufactured by Kanegafuchi Kagaku Co., Ltd.) (20 parts) and a stabilizer for polyvinyl chloride ("KS-41" manufactured by Kyodo Yakuhin Co., Ltd.) (5 parts) are kneaded well by the aid of a roll having a surface temperature maintained at 180° C. The blend is then pressed to form a sheet of 1 mm thickness. The acrylic resin films obtained as in Example 1 are placed on both surfaces of the above prepared sheet, and the resulting multi-layer produced is melt-adhered by the aid of a press at 180° C.

The thus obtained multi-layer product has a lustrous surface and is not broken on bending. Even after exposure to outdoor atmosphere for 5 months, no change in the surface appearance and the mechanical properties is seen. In the same test, PVC-MBS resin shows a deteriorated surface appearance and a markedly decreased impact strength.

EXAMPLE 3

EVA emulsion ("Sumikaflex No. 400" manufactured by Sumitomo Chemical Co., Ltd.) is applied on a synthetic paper mainly consisting of HIPS ("Spiax" manufactured by Sumitomo Chemical Co., Ltd.) having a printed pattern on the surface and, after drying, an acrylic resin film as obtained in Example 1 is placed thereon. The resulting layer of materials is adhered by pressing at 120° C to give a multi-layer product.

The printed pattern on the surface of the synthetic paper looks better, because of the luster due to the acrylic resin film. Even after exposure to the outdoor atmosphere for 1 year, no change in the appearance is seen and no breaking is caused on bending.

EXAMPLE 4

As in Example 1, an acrylic resin film is prepared by the use of a composition comprising acrylic resin ("Sumipex LG" manufactured by Sumitomo Chemical Co., Ltd.) (65 parts), EVA/VC graft copolymer ("Sumigraft GF" manufactured by Sumitomo Chemical Co., Ltd.) (35 parts), a stabilizer for polyvinyl chloride ("KS-41" manufactured by Kyodo Yakuhin Co., Ltd.) (2 parts) and an ultraviolet ray inhibitor ("Tinuvin 326" manufactured by Geigy A.G.) (0.5 part).

EVA films ("Evatate R5011" manufactured by Sumitomo Chemical Co., Ltd.) are brought in contact with the upper and lower surfaces and the side surfaces of a synthetic wooden plate mainly consisting of HIPS ("Home-sunoko" manufactured by Showa Formex Co., Ltd.) having wooden patterns on the surfaces, and the above prepared acrylic resin films are placed thereon. Melt adhesion is effected at 100° C to give a multilayer product.

The wooden patterns in the resulting multi-layer product looks better, because of the luster due to the acrylic resin. Even after exposure to the outdoor atmosphere for 1 year, no change in the appearance and the mechanical properties is seen.

EXAMPLE 5

On the upper and lower surface of a sheet of 1 mm thickness obtained by pressing PP ("Sumitomo Noblen H-503B" manufactured by Sumitomo Chemical Co., Ltd.), an EVA latex ("Sumikaflex No. 400" manufactured by Sumitomo Chemical Co., Ltd.) is applied. After drying, acrylic resin films as obtained in Example 4 are placed on the surfaces, and the resulting layer of materials are pressed at 120° C to give a multi-layer product.

The multi-layer product is beautifully lustrous. Even after exposure to the outdoor atmosphere for 1 year, no change in the appearance and the mechanical properties is seen. No breaking is caused on bending.

What is claimed is:

1. A multi-layer product which comprises a layer of a synthetic resin which is adversely affected by ultraviolet rays and oxygen and a protective layer adhered thereon containing about 50 to 99 percent by weight of a polymer of an alkyl ester of acrylic or methacrylic acid incorporated with about 1 to 50 percent by weight of ethylene:vinyl acetate copolymer-vinyl chloride graft copolymer.

2. The multi-layer product of claim 1, wherein the synthetic resin is an addition polymer.

3. The multi-layer product of claim 1, wherein the synthetic resin is selected from the group consisting of an acrylonitrile-butadiene-styrene resin, a methyl methacrylate-butadiene-styrene resin, a high impact polystyrene resin, a polypropylene resin, a polyvinyl chloride resin and mixtures thereof.

4. The multi-layer product of claim 3, wherein the polymer of an alkyl ester of acrylic or methacrylic acid is selected from the group consisting of homopolymers of methyl acrylate and methyl methacrylate and the copolymers of the monomers of said polymers with at least one vinylic monomer selected from the group consisting of styrene, acrylonitrile, N-allyl-maleimide, alkyl acrylates having an alkyl moiety of one to eight carbon atoms, and alkyl methacrylates having an alkyl moiety of one to eight carbon atoms.

5. The multi-layer product according to claim 1, wherein the ethylene:vinyl acetate copolymer-vinyl chloride graft copolymer comprises ethylene:vinyl acetate copolymer and vinyl chloride graft-polymerized thereon at a weight ratio of about 10:90 to 90:10, the content of the vinyl acetate unit in the ethylene:vinyl acetate copolymer being about 20 to 60 percent by weight, based on the amount of the ethylene:vinyl acetate copolymer.

6. The multi-layer product according to claim 1, wherein the ethylene:vinyl acetate copolymer-vinyl chloride graft copolymer is prepared by graft-polymerizing vinyl chloride on ethylene:vinyl acetate copolymer, the weight ratio of the copolymer and vinyl chloride being from about 10:90 to 90:10 and the content of the vinyl acetate unit in the ethylene:vinyl acetate copolymer being about 20 to 60 percent by weight, based on the amount of the ethylene:vinyl acetate copolymer.

7. The multi-layer product of claim 1, wherein an ultraviolet ray inhibitor is incorporated into the synthetic resin.

8. The multi-layer product of claim 1, wherein a binding agent is provided between the layer of synthetic resin and the protective layer, for adhering said layers together.

9. The multi-layer product of claim 1, wherein a stabilizer is incorporated into the graft copolymer.

10. The multi-layer product of claim 8, wherein the binding agent is an ethylene-vinyl acetate copolymer.

11. The multi-layer product of claim 1, further adhered to a substrate.

12. The multi-layer product of claim 1, wherein the acrylic resin is present in an amount of 80 parts by weight and the graft copolymer is present in an amount of 20 parts by weight.

13. The multi-layer product of claim 1, wherein the acrylic resin is present in an amount of 65 parts by weight and the graft copolymer is present in an amount of 35 parts by weight.

14. The multi-layer product of claim 1, wherein the synthetic resin is a blend of 80 parts by weight polyvinyl chloride and 20 parts by weight of a methyl methacrylatebutadiene-styrene resin.

* * * * *